US 6,710,863 B2

(12) United States Patent
Hotate et al.

(10) Patent No.: US 6,710,863 B2
(45) Date of Patent: Mar. 23, 2004

(54) APPARATUS AND METHOD FOR MEASURING CHARACTERISTICS OF OPTICAL FIBERS

(75) Inventors: Kazuo Hotate, 17-17, Fuda 6-chome, Chofu-shi, Tokyo (JP); Motokatsu Kannou, Kumamoto (JP)

(73) Assignees: Kazuo Hotate, Tokyo (JP); Ando Electric Co., Ltd., Tokyo (JP); Kyusyu Ando Electric Company Limited, Kumamoto-ken (JP)

(*) Notice: Subject to any disclaimer, the term of this patent is extended or adjusted under 35 U.S.C. 154(b) by 0 days.

(21) Appl. No.: 10/187,778

(22) Filed: Jul. 1, 2002

(65) Prior Publication Data

US 2003/0007142 A1 Jan. 9, 2003

(30) Foreign Application Priority Data

Jul. 2, 2001 (JP) .................................... P2001-201053

(51) Int. Cl.[7] .............................................. G01N 21/00
(52) U.S. Cl. ................................................. 356/73.1
(58) Field of Search .......................... 356/73.1; 385/12, 385/13, 126, 127; 250/227.11, 227.14

(56) References Cited

U.S. PATENT DOCUMENTS 5,696,863 A * 12/1997 Kleinerman ................ 385/123

FOREIGN PATENT DOCUMENTS

| GB | 2 134 345 A1 | 8/1984 | |
| GB | 2134345 | 8/1984 | |
| JP | 2000-180265 | 6/2000 | ............. G01J/9/00 |
| WO | 83/01303 A1 | 4/1983 | |
| WO | 94/05967 A1 | 3/1994 | |

* cited by examiner

Primary Examiner—Richard A. Rosenberger
Assistant Examiner—Vincent P Barth
(74) Attorney, Agent, or Firm—Darby & Darby

(57) ABSTRACT

A light source produces laser beams that are subjected to frequency modulation whose frequency can be adequately set or varied. A light modulator modulates laser beams with respect to the center wavelength, so that the lower sideband is used as probe light input into one end of the measured optical fiber. A pulse modulator produces laser pulses based on laser beams as pump light, which is input into the other end of the measured optical fiber, along which correlation peaks emerge at different positions. The output light is extracted from the other end of the measured optical fiber and is supplied to a timing adjuster, which adjusts a transmission timing to allow transmission of light proximate to a measuring point in the measured optical fiber therethrough. Thus, it is possible to reliably measure characteristics of the measured optical fiber entirely over the relatively long distance with high spatial resolutions.

12 Claims, 8 Drawing Sheets

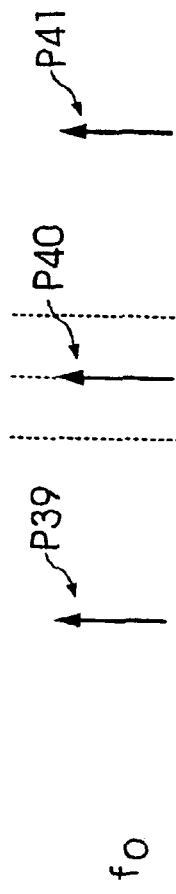
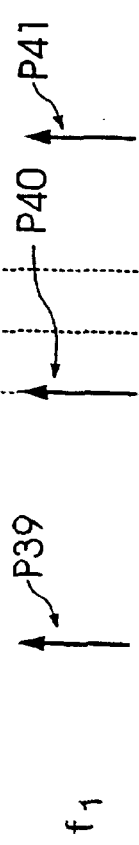
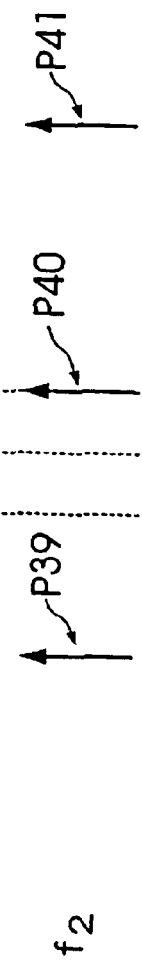
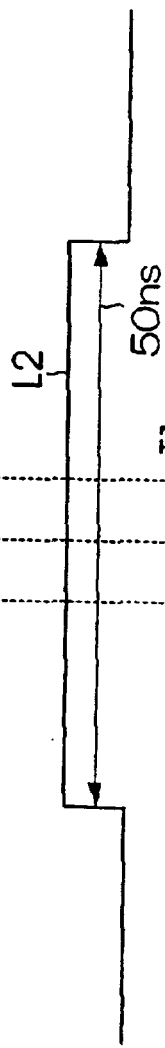
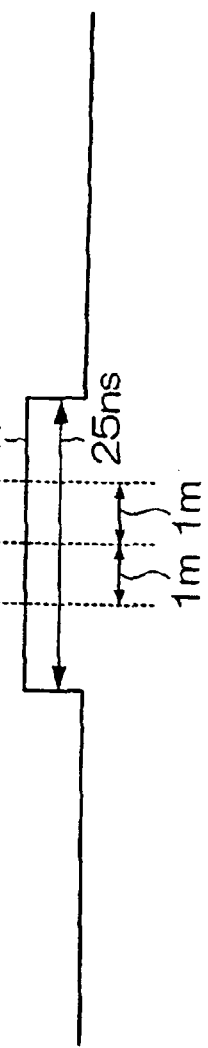
FIG. 4A
FIG. 4B
FIG. 4C
FIG. 4D
FIG. 4E

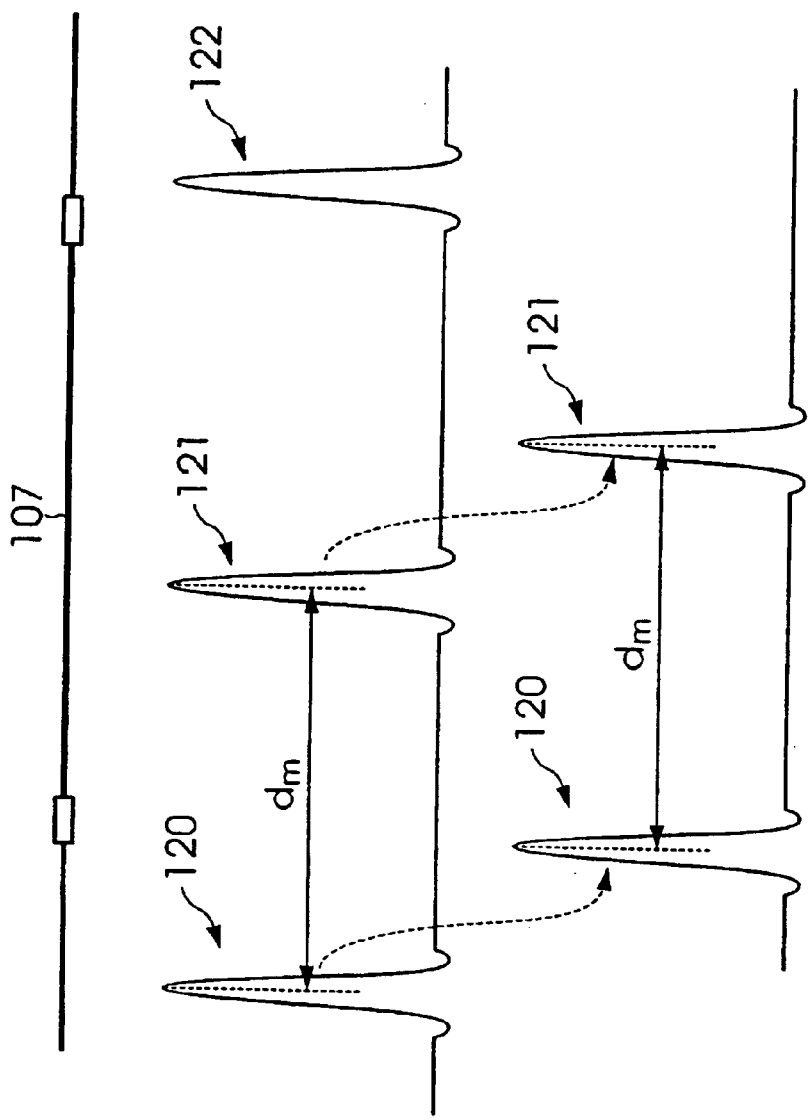

APPARATUS AND METHOD FOR MEASURING CHARACTERISTICS OF OPTICAL FIBERS

BACKGROUND OF THE INVENTION

1. Field of the Invention

This invention relates to apparatuses and methods for measuring characteristics of optical fibers in length directions based on stimulated Brillouin scattering effects that occur in optical fibers.

2. Description of the Related Art

Recently, optical fibers are frequently used as information transmission media to secure high-speed transmission for large amounts of information. In order to secure satisfactory communication qualities, it is necessary to periodically perform measurements on characteristics of optical fibers in length directions. For example, measurements are performed to locate faults or defects that actually occur in optical fibers or that may likely occur. Specifically, OTDR (i.e., Optical Time Domain Reflectometer) measurement techniques are provided to measure characteristics (e.g., distortions) of optical fibers. That is, light pulses are input into one ends of optical fibers, wherein measurement is performed with respect to backward scattering light that occur in optical fibers during propagation of light pulses therethrough.

Since the OTDR measurement techniques are capable of specifying distorted positions of optical fibers, they are applicable to optical fiber sensors and the like that measure temperature distributions in environments for facilitating optical fibers as well as distributions of physical values such as distortions. In order to perform maintenance and management with respect to large-scale structures such as dams and embankments, it is necessary to detect distortions of large-scale structures. In this case, large-scale structures are wired with optical fibers whose characteristics such as distortions are measured by optical fiber sensors. Recently, it is strongly demanded to develop high-performance optical fiber sensors, having high spatial resolutions, which can specify distorted positions of optical fibers as accurately as possible.

To cope with the above demand, there is provided a measurement apparatus that performs measurement based on stimulated Brillouin scattering effects induced in 'measured' optical fibers. Specifically, stimulated Brillouin scattering effects occur in optical fibers in which probe beams are input into one ends while pump beams are input into other ends. FIG. 5 is a block diagram showing an example of the measurement apparatus using stimulated Brillouin scattering effects. Herein, reference numeral 100 designates a light source that comprises a semiconductor laser 101 and a signal generation circuit 102. The signal generation circuit 102 performs frequency modulation or phase modulation on laser beams output from the semiconductor laser 101, thus generating modulation signals. Reasons why the frequency modulation or phase modulation is performed on laser beams output from the semiconductor laser 101 will be described later. Briefly speaking, however, the frequency modulation or phase modulation is required to determine positions of correlation peaks that can be clearly recognized between probe light L11 and pump light L12, which are input into a measured optical fiber 107 from different ends respectively. Reference numeral 103 designates an optical coupler or branch that provides two branches with respect to laser beams output from the light source 100.

That is, laser beams of the first branch from the optical branch 103 are input into a light modulator 104, wherein they are subjected to modulation to shift light frequencies thereof. Due to the modulation of the light modulator 104, sidebands are caused to occur with respect to the center wavelength of laser beams. The light modulator 104 comprises a microwave generator 105 and a light intensity modulator 106. The light modulator 104 modulates laser beams to produce sidebands in order to cause stimulated Brillouin scattering effects in the measured optical fiber 107. The microwave generator 105 generates microwaves for frequency shifting, which are imparted to laser beams output from the optical branch 103. The light intensity modulator 106 produces sidebands having frequency differences, which match frequencies of microwaves generated by the microwave generator 105, with respect to the center frequency of laser beams input thereto. Incidentally, the microwave generator 105 can vary the frequency of microwaves output therefrom. The light intensity modulator 106 outputs the probe light L11, which is input into one end of the measured optical fiber 107. Specifically, the lower sideband is used for the probe light L11.

The optical branch 103 also provides laser beams of the second branch, which are input to a light delay 108. That is, the light delay 108 delays incoming laser beams with respect to time in order to delay the pump light L12, which is input into the other end of the measured optical fiber 107. Due to the provision of the light delay 108, a prescribed delay time is set between the probe light L11 and the pump light L12. Delayed laser beams output from the light delay 108 are supplied to the other end of the measured optical fiber 107 via an optical branch 109 as the pump light L12.

The probe light L11 propagate through the measured optical fiber 107 from one end to the other end. The optical branch 109 branches off the output light of the measured optical fiber 107 having light frequency bands containing the frequency band of the probe light L11. The intensity of the probe light L11 may be influenced by stimulated Brillouin scattering effects that occur in the measured optical fiber 107. A light wavelength filter 110 has a filtering characteristic to allow transmission of only the lower sideband, within the light output from the optical branch 109, therethrough. A light detector 111 detects light power of the lower sideband that is isolated by the optical wavelength filter 110.

In the measurement apparatus having the aforementioned configuration shown in FIG. 5, laser beams that are subjected to frequency modulation or phase modulation and that are output from the light source 100 are supplied to the optical branch 103, which in turn provides laser beams of the first branch that are input into the light modulator 104. In the light modulator 104, laser beams are modulated (in intensity) to provide the probe light L11 whose light frequency can be varied. The probe light L11 is incident on one end of the measured optical fiber 107. In addition, the optical branch 103 provides laser beams of the second branch that are delayed by the prescribed delay time in the light delay 108 and that are then incident on the other end of the measured optical fiber 107 via the optical branch 109 as the pump light L12.

Both the probe light L11 and the pump light L12 are respectively produced based on the same laser beams that are modulated in frequency or phase in the same light source 100. Therefore, the probe light L11 and the pump light L12, which are input into the measured optical fiber 107 from opposite ends respectively, are mutually influenced by each other to periodically cause correlation peaks. At each position showing a correlation peak, a 'constant' light frequency difference appears between the probe light L11 and the pump light L12, which may be amplified in light intensity due to stimulated Brillouin scattering effects.

At other positions other than the positions of correlation peaks, the probe light L11 and the pump light L12 may be normally varied in light frequencies, so that the probe light L11 may not be affected by Brillouin amplification and will be substantially unchanged in light intensity. Therefore, it can be said that the gain of the probe light L11 may be greatly caused by Brillouin amplification at the positions of correlation peaks.

The probe light L11 whose gain is caused by Brillouin amplification is output from the other end of the measured optical fiber 107, from which it is supplied to the optical branch 109. Then, the probe light L11 that is transmitted through the optical branch 109 is input into the light wavelength filter 110, wherein a part of the probe light L11 corresponding to the lower sideband is isolated and is supplied to the light detector 111. Thus, the light detector 111 detects the intensity of the output light of the light wavelength filter 110.

FIGS. 6A and 6B diagrammatically show correlation peaks that appear in the measured optical fiber 107 shown in FIG. 5. In FIG. 6B, reference symbol '$f_m$' represents the frequency of the frequency modulation that is performed in the semiconductor laser 101, and '$d_m$' represents an interval of distance between adjoining correlation peaks. The following description is made with respect to the frequency modulation that is performed on laser beams radiated from the semiconductor laser 101, whereas in the case of the phase modulation that may be performed on laser beams radiated from the semiconductor laser 101, '$f_m$' should be read as the frequency of the phase modulation. As shown in FIG. 6B, the stimulated Brillouin scattering may intensely occur at the position of a correlation peak formed between the probe light L11 and the pump light L12, which are input into the measured optical fiber 107 from opposite ends. Herein, reference numerals 120, 121, and 122 designate waveform spikes representing correlation peaks, wherein the waveform spike 120 represents a zero-order correlation peak, the waveform spike 121 represents a first-order correlation peak, and the waveform spike 122 represents a second-order correlation peak. At the position of the zero-order correlation peak 120, the optical path difference between the probe light L11 and the pump light L12 becomes zero.

The distance $d_m$ between adjoining correlation peaks can be calculated using the frequency $f_m$ of the frequency modulation of the light source 100 and the light velocity v measured inside of the measured optical fiber 107 in accordance with the following equation (1).

$$d_m = \frac{v}{2 \cdot f_m} \quad (1)$$

The equation (1) shows that the distance $d_m$ between adjoining correlation peaks depends upon the frequency $f_m$ of the frequency modulation that is performed on laser beams of the semiconductor laser 101.

FIGS. 7A to 7C show variations of positions of correlation peaks that are caused by varying the frequency of the frequency modulation. As shown in FIGS. 7B and 7C, when the frequency $f_m$ of the frequency modulation is varied, the distance $d_m$ between adjoining correlation peaks is correspondingly varied; thus, it is possible to change positions of correlation peaks. However, it is impossible to change the position of the zero-order correlation peak 120 by merely varying the frequency $f_m$ of the frequency modulation. Incidentally, reference symbol δ represents spatial resolution of a correlation peak.

It was described above that the position of the zero-order correlation peak 120 matches the position at which the optical path difference between the probe light L11 and the pump light L12 becomes zero. Next, a method of changing the position of the zero-order correlation peak 120 will be described with reference to FIGS. 8A to 8C. That is, it is possible to change the position of the zero-order correlation peak 120 by varying the delay time of the light delay 108 shown in FIG. 5. Herein, the position of the zero-order correlation peak 120 does not depend upon the frequency $f_m$ of the frequency modulation. Therefore, by varying the delay time of the light delay 108, it is possible to easily move the position of the zero-order correlation peak 120 as well as the positions of the first-order correlation peak 121 and second-order correlation peak 122 without varying the distance $d_m$ between adjoining correlation peaks.

In the above, however, it may be meaningless that spatial resolutions of correlation peaks be greatly increased compared with the moving distances of the positions of the correlation peaks. The spatial resolution $\delta_z$ can be calculated using the Brillouin gain linear width $\Delta v_B$, the frequency $f_m$ of the frequency modulation of the light source 100, the frequency variation $\Delta f$ that occurs in the frequency modulation of the light source 100, and the light velocity v measured inside of the measured optical fiber 107 in accordance with the following equation (2).

$$\delta_z = \frac{v \times v_B}{2\pi \times f_m \times \Delta f} \quad (2)$$

According to the above equation (2), it is necessary to adjust the spatial resolution $\delta_z$ to be sufficiently small compared with the moving distance of the correlation peak while adequately adjusting the frequency $f_m$ of the frequency modulation of the light source 100. Details of this technology may be disclosed in Japanese Unexamined Patent Publication No. 2000-180265.

In the measurement apparatus of FIG. 5 using stimulated Brillouin scattering effects, both the probe light L11 and the pump light L12 are continuous light beams, correlation peaks of which may emerge periodically. In order to measure characteristics of the measured optical fiber 107, it is necessary to adjust the delay time of the light delay 108 and the frequency $f_m$ of the frequency modulation in such a way that a single correlation peak emerges in the measured optical fiber 107.

In principle, the measurement apparatus measures characteristics of the measured optical fiber at the position corresponding to the correlation peak. In order to perform measurement entirely over the measured optical fiber 107 in the length direction, the measurement apparatus should be adjusted in such a way that a single correlation peak exists in the measured optical fiber 107, and then it is moved from one end to the other end of the measured optical fiber 107. As described above, however, the measurement apparatus must deal with correlation peaks that periodically emerge in the measured optical fiber, wherein the measurement can be performed only for a small distance, which may be several meters or so, while securing high spatial resolutions. Hence, there is a problem that the measured optical fiber must be limited in length in the measurement.

SUMMARY OF THE INVENTION

It is an object of the invention to provide an apparatus and a method for measuring characteristics of optical fibers, wherein measurements can be reliably performed on optical fibers along relatively long lengths (or distances) while securing high spatial resolutions.

An optical fiber characteristic measurement apparatus of this invention includes a light source for producing laser beams that are subjected to frequency modulation, and a light modulator for modulating laser beams to produce sidebands with respect to the center wavelength of laser beams, so that the lower sideband of modulated laser beams is used as probe light (L1) input into one end of the measured optical fiber. A pulse modulator produces laser pulses based on laser beams as pump light (L2), which is input into the other end of the measured optical fiber. Thus, as the pump light propagates through the measured optical fiber, correlation peaks sequentially emerge at different positions along with the measured optical fiber.

The output light is extracted from the other end of the measured optical fiber and is supplied to a timing adjuster, which adjusts a transmission timing (T1) to allow transmission of light proximate to a measuring point in the measured optical fiber therethrough. That is, the light transmitted through the timing adjuster is supplied to a light detector via a light wavelength filter, wherein the intensity of the light proximate to the measuring point in the measured optical fiber can be accurately detected to determine characteristics of the measured optical fiber.

In the above, the frequency of the frequency modulation of the light source is slightly increased or decreased to move a correlation peak leftwards or rightwards in relation to the measuring point in the measured optical fiber.

Thus, it is possible to reliably measure characteristics of the measured optical fiber entirely over the relatively long distance with high spatial resolutions.

BRIEF DESCRIPTION OF THE DRAWINGS

These and other objects, aspects, and embodiments of the present invention will be described in more detail with reference to the following drawings, in which:

FIG. 4A diagrammatically shows positions of correlation peaks of thirty-ninth order, fortieth-order, and forty-first order in case of $f_0$ in frequency modulation;

FIG. 4B diagrammatically shows positions of correlation peaks of thirty-ninth order, fortieth-order, and forty-first order in case of $f_1$ in frequency modulation;

FIG. 4C diagrammatically shows positions of correlation peaks of thirty-ninth order, fortieth-order, and forty-first order in case of $f_2$ in frequency modulation;

FIG. 4D shows a laser pulse of the pump light L2 that is transmitted through the measured optical fiber in proximity to the measuring point;

FIG. 4E shows a transmission timing T1 that the timing adjuster allows transmission of light therethrough;

FIG. 8A diagrammatically shows a measured optical fiber;

FIG. 8B shows waveform spikes designating correlation peaks that periodically emerge along with the measured optical fiber shown in FIG. 8A; and FIG. 8C shows that correlation peaks are shifted while maintaining the same interval of distance therebetween.

DESCRIPTION OF THE PREFERRED EMBODIMENT

This invention will be described in further detail by way of examples with reference to the accompanying drawings.

Figure 1:
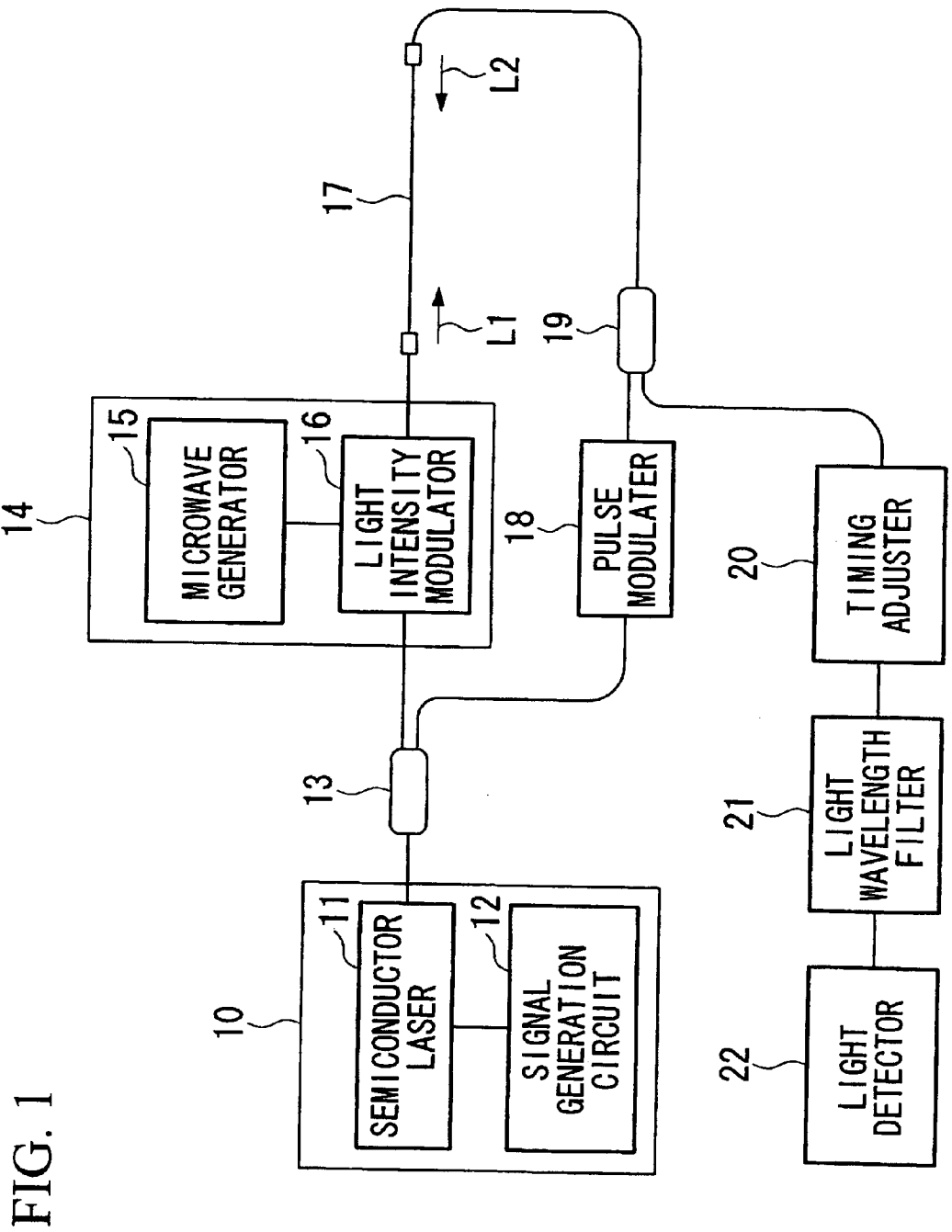
FIG. 1 is a block diagram showing the overall configuration of an optical fiber characteristic measurement apparatus in accordance with the preferred embodiment of the invention.

FIG. 1 is a block diagram showing the overall configuration of an optical fiber characteristic measurement apparatus in accordance with the preferred embodiment of the invention. Herein, reference numeral 10 designates a light source, which comprises a semiconductor laser 11 and a signal generation circuit 12. Specifically, the light source 10 uses the semiconductor laser 11 of the small size, which for, example, corresponds to 'MQW-DFB-LD' (i.e., Multi-Quantum Well—Distributed Feed-Back—Laser Diode) that is capable of radiating laser beams having narrow spectrum widths. The signal generation circuit 12 generates sine-wave signals (i.e., modulation signals) for performing frequency modulation or phase modulation on laser beams radiated from the semiconductor laser 11. The sine-wave signals are supplied to the semiconductor laser 11. The following descriptions are made with respect to the frequency modulation that is performed on laser beams of the semiconductor laser 11 by the signal generation circuit 12. Reference numeral 13 designates an optical branch that provides laser beams output from the light source 10 into two branches.

That is, laser beams of the first branch from the optical branch 13 are supplied to a light modulator 14, which comprises a microwave generator 15 and a light intensity modulator 16. The light modulator 14 modulates laser beams branched from the optical branch 13, in other words, it shifts light frequencies of laser beams, thus generating sidebands with respect to the center wavelength of laser beams. The microwave generator 15 generates microwaves whose frequency corresponds to frequency shifts, which are imparted to laser beams branched from the optical branch 13. In addition, the light intensity modulator 16 causes sidebands having the frequency difference, which matches the frequency of microwaves generated by the microwave generator 15, with respect to the center frequency of incoming laser beams. The microwave generator 15 is capable of varying frequencies of microwaves. The light modulator 14 produces and outputs probe light L1, which is incident on one end of a measured optical fiber 17. Herein, the probe light L1 corresponds to the lower sideband.

Laser beams of the second branch from the optical branch 13 are supplied to a pulse modulator 18, wherein continuous laser beams are transformed into pulses. For example, the pulse modulator 18 is constituted by an electro-optical (EO) switch. That is, the pulse modulator 18 produces and outputs laser pulses, which are supplied to the other end of the measured optical fiber 17 via an optical branch 19 as pump light L2. Therefore, the probe light L1 and the pump light L2 are respectively input into the measured optical fiber 17 from opposite ends.

The optical branch 19 branches out the light of light frequency bands including the probe light L1 that propagate through the measured optical fiber 17 and are output from the other end of the measured optical fiber 17. Herein, the intensity of the probe light L1 is influenced by inductive Brillouin scattering effects that occur in the measured optical fiber 17. The output light of the light branch 19 is input into a timing adjuster 20. The timing adjuster 20 allows transmission of only the inductive Brillouin scattering light, which occur in proximity the measuring point (for measuring characteristics) located in the measured optical fiber 17, therethrough.

Figures 2A, 2B, 2C:
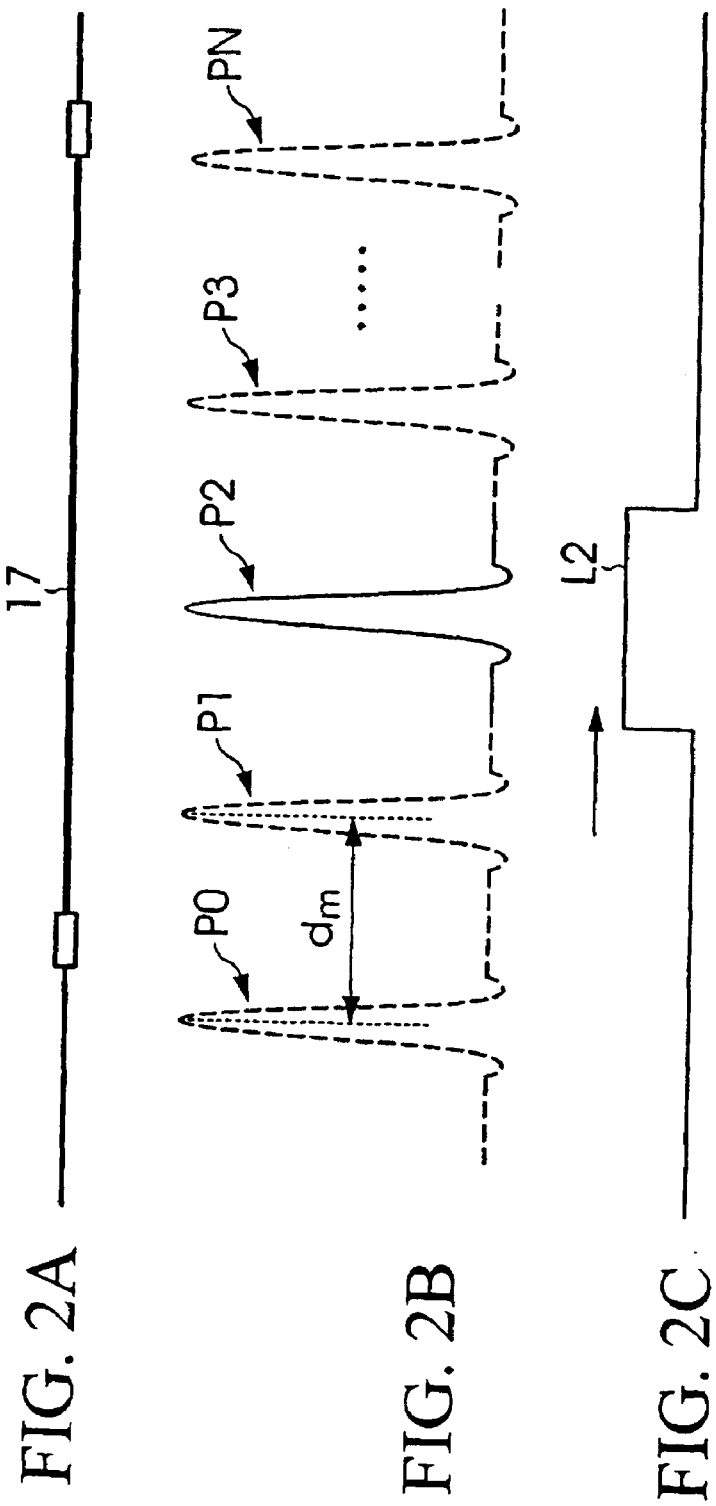
FIG. 2A diagrammatically shows a measured optical fiber.
FIG. 2B shows waveform spikes designating correlation peaks that periodically emerge along with the measured optical fiber shown in FIG. 2A.
FIG. 2C shows a laser pulse of pump light L2 that is transmitted through the position corresponding to a correlation peak P2 in the measured optical fiber.

In the present embodiment, the probe light L1 that is the continuous light beam is input into one end of the measured optical fiber 17, while the pump light L2 that consists of laser pulses is input into the other end of the measured optical fiber 17. Propagation and combination of the probe light L1 and the pump light L2 will be described with reference to FIGS. 2A and 2B. In the measured optical fiber 17, as the pump light L2 propagates through the measured optical fiber 17, correlation peaks P0 to PN (where 'N' denotes a positive integer) emerge in a time-series manner at different positions in the measured optical fiber 17, which is shown in FIG. 2B.

Therefore, it is possible to measure only the light that proximately comes from the measuring point in consideration of the timing when the pump light L2 is transmitted through in proximity to the measuring point of the measured optical fiber 17 and the time that is taken for the light proximate to the measuring point to reach the timing adjuster 20. That is, the timing adjuster 20 is adjusted in operation timings thereof in consideration of the following time factors.

(1) The timing when the pulse modulator 18 produces pulses based on laser beams.
(2) The time that is taken for the pump light L2 consisting of laser pulses output from the pulse modulator 18 to be incident on the other end of the measured optical fiber 17 via the light branch 19.
(3) The time that is taken for the pump light L2 to proximately reach the measuring point from the other end of the measured optical fiber 17.
(4) The time that is taken for the light proximate to the measuring point to reach the other end of the measured optical fiber 17.
(5) The time that is taken for the light proximate to the measuring point to reach the timing adjuster 20 via the light branch 19 from the other end of the measured optical fiber 17.

The light that is transmitted through the aforementioned timing adjuster 20 is incident on a light wavelength filter 21. The light wavelength filter 21 has a filtering characteristic that allows transmission of only the lower sideband of the light, which is transmitted through the timing adjuster 20, therethrough. A light detector 22 detects the intensity (or power) of the light of the lower sideband that is isolated by the light wavelength filter 21.

Next, the overall operation of the optical fiber characteristic measurement apparatus of FIG. 1 will be described in detail. First, laser beams that are modulated in frequencies and are output from the light source 10 are supplied to the light branch 13, which in turn provide laser beams of the first branch to the light modulator 14. The light modulator 14 modulates incoming laser beams (in intensity) to produce the probe light L1 whose light frequency can be varied. The probe light L1 is incident on one end of the measured optical fiber 17. The light branch 13 also provides laser beams of the second branch to the pulse modulator 18, which in turn produces laser pulses. The laser pulses are supplied to the other end of the measured optical fiber 17 via the light branch 19 as the pump light L2.

That is, the probe light L1 that is the continuous light beam and the pump light L2 consisting of laser pulses are respectively input into the measured optical fibers 17 from opposite ends. FIG. 2B shows that as the pump light L2 propagates through the measured optical fiber 17, the prescribed number of correlation peaks P0 to PN (where 'N' denotes a positive integer) emerge in a time-series manner due to the frequency modulation at different positions in the measured optical fiber 17. FIGS. 2B and 2C show that a laser pulse of the pump light L2 is transmitted through the prescribed position in proximity to the correlation peak P2 in the measured optical fiber 17. FIG. 2B shows only the waveform spike corresponding to the correlation peak P2 by a solid line, while other waveform spikes are drawn by dotted lines. Specifically, the correlation peaks P0 and P1 match the positions through which previous laser pulses of the pump light L2 were transmitted in the past; and the correlation peaks P3 to PN match the positions through which laser pulses of the pump light L2 will be transmitted in the future.

The probe light L1 may be increased in gain due to Brillouin amplification every time it is transmitted through the position corresponding to each of the correlation peaks P0 to P3. The probe light L1 is output from the other end of the measured optical fiber 17 and is then input to the light branch 19. The probe light L1 that is output from the light branch 19 is input to the timing adjuster 20, which allows transmission of only a part of the 'incoming' probe light L1, which is input at the prescribed timing, therethrough. Then, the probe light L1 transmitted through the timing adjuster 20 is input to the light wavelength filter 21, wherein the light of the lower sideband is isolated and is input to the light detector 22. The light detector 22 detects the intensity of the probe light L1 of the lower sideband. Thus, it is possible to measure characteristics of the measured optical fiber 17.

Next, the method of changing (or shifting) the measuring point in the measured optical fiber 17 by the optical fiber characteristic measurement apparatus will be described with reference to FIGS. 3A to 3F, which are used to explain measurement of characteristics in proximity to a measuring position D1 in the measured optical fiber 17 in relation to a third-order correlation peak P3. That is, the third-order correlation peak P3 emerges in proximity to the measuring position D1 in the measured optical fiber 17. FIG. 3F diagrammatically shows the prescribed timing 'T1' at which the timing adjuster 20 allows transmission of the light that comes from the desired position of the measured optical fiber 17. Specifically, the timing adjuster 20 is set up in timing so as to transmit the light proximate to the measuring position D1 therethrough.

Figure 5:
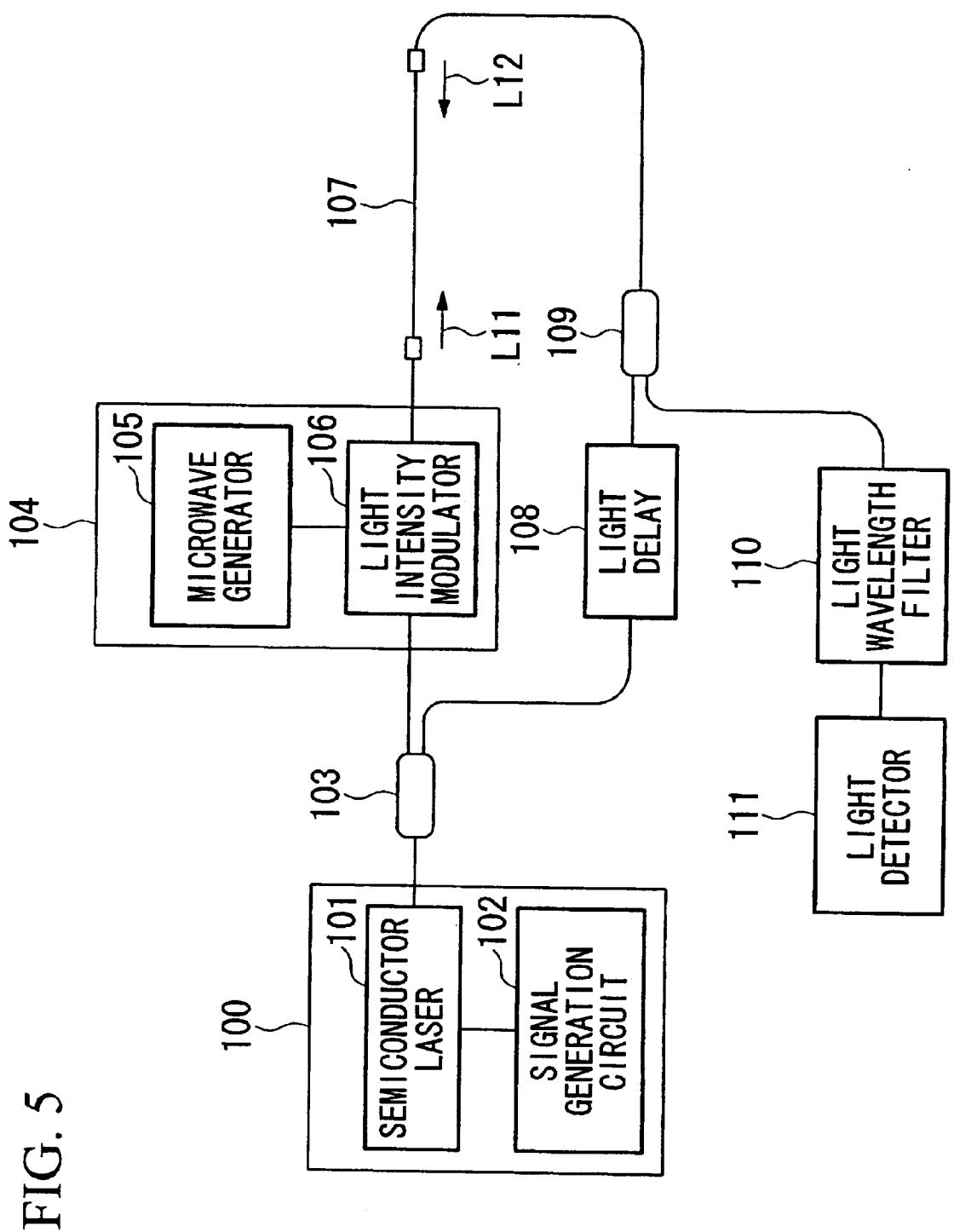
FIG. 5 is a block diagram showing an example of the measurement apparatus that performs measurement based on stimulated Brillouin scattering effects.
Figures 6A, 6B:
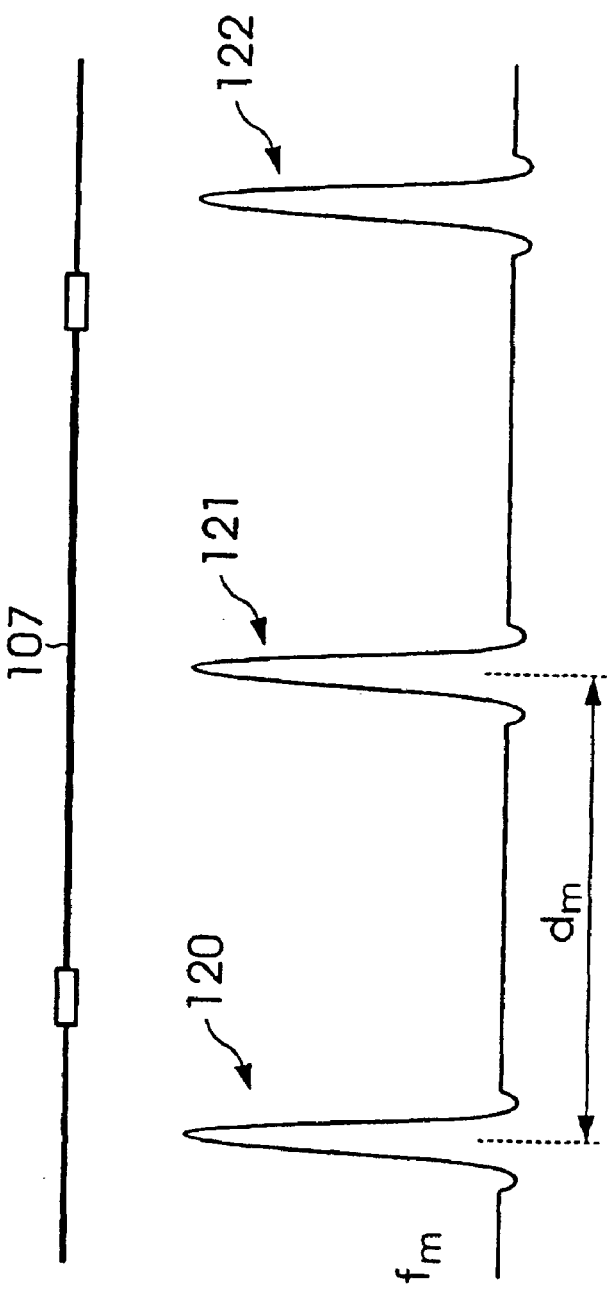
FIG. 6A diagrammatically shows a measured optical fiber.
FIG. 6B shows waveform spikes designating correlation peaks that periodically emerge along with the measured optical fiber shown in FIG. 6A.
Figures 7A, 7B, 7C:
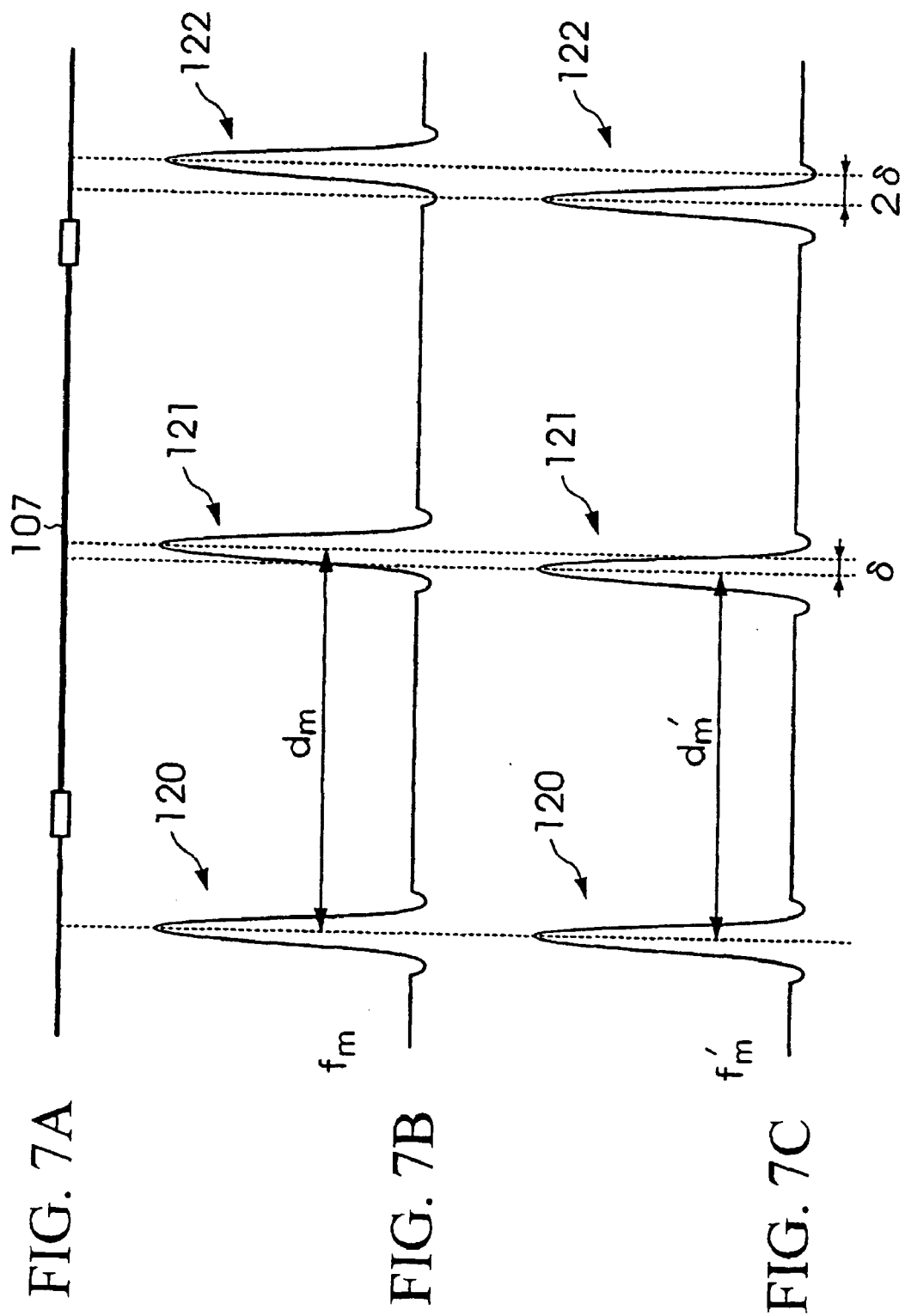
FIG. 7A diagrammatically shows a measured optical fiber.
FIG. 7B shows waveform spikes designating correlation peaks that periodically emerge along with the measured optical fiber shown in FIG. 7A.
FIG. 7C shows that correlation peaks are shifted by varying intervals of distance therebetween.

In order to move the correlation peak along with the measured optical fiber, the foregoing measurement apparatus of FIG. 5 employs the following operations.

(1) To vary the delay time of the light delay 108.
(2) To vary the frequency $f_m$ of the frequency modulation of the light source 100 in order to vary the interval of distance between adjoining correlation peaks in accordance with the equation (1).

In the present embodiment, the apparatus varies the frequency $f_m$ of the frequency modulation of the light source 10 in order to perform measurement on characteristics in proximity to the measuring position in the measured optical fiber.

Figure 3A:
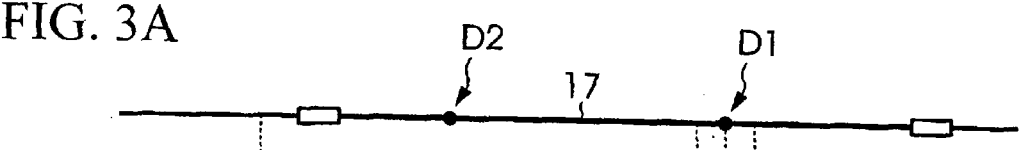
FIG. 3A diagrammatically shows a measured optical fiber.
Figure 3B:
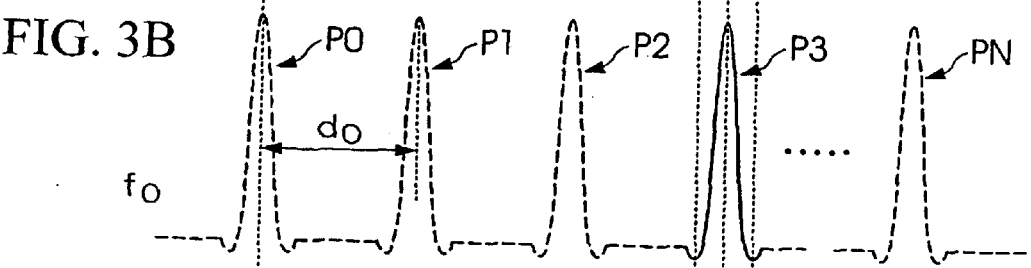
FIG. 3B shows waveform spikes designating correlation peaks that periodically emerge along with the measured optical fiber shown in FIG. 3A in the case of modulation frequency $f_0$.
Figure 3C:
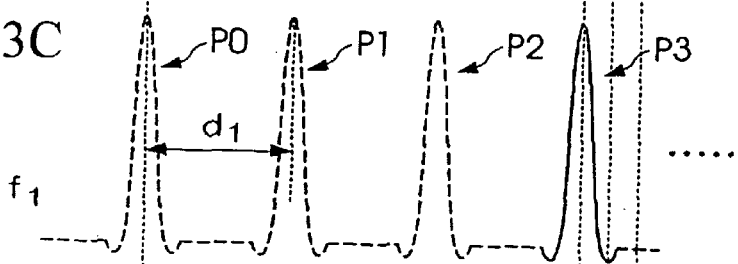
FIG. 3C shows waveform spikes designating correlation peaks that periodically emerge along with the measured optical fiber shown in FIG. 3A when the modulation frequency is increased from $f_0$ to $f_1$.
Figure 3D:
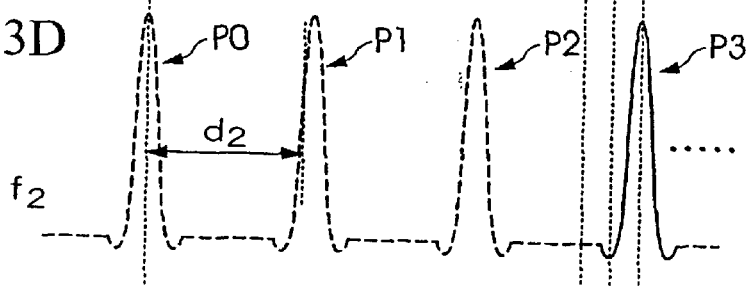
FIG. 3D shows waveform spikes designating correlation peaks that periodically emerge along with the measured optical fiber shown in FIG. 3A when the modulation frequency is decreased from $f_0$ to $f_2$.
Figure 3E:
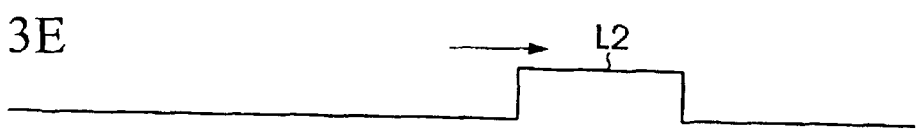
FIG. 3E shows a laser pulse of pump light L2 that is transmitted through a measuring position corresponding to a correlation peak P3 in the measured optical fiber.
Figure 3F:
FIG. 3F shows a transmission timing T1 that a timing adjuster shown in FIG. 1 allows transmission of light therethrough.

That is, the frequency $f_m$ of the frequency modulation is changed from $f_0$ to $f_1$ or $f_2$ (see FIGS. 3B, 3C, and 3D). Specifically, by increasing the frequency $f_m$ from $f_0$ to $f_1$, the position of the correlation peak P3 is shifted leftwards with respect to the measuring point D1. Alternatively, by decreasing the frequency $f_m$ from $f_0$ to $f_2$, the position of the correlation peak P3 is shifted rightwards with respect to the measuring position D1. That is, by slightly adjusting the position of the correlation peak P3 leftwards or rightwards with respect to the measuring position D1, it is possible to accurately measure characteristics in proximity to the measuring position D1 in the measured optical fiber 17. Incidentally, the apparatus uses the first-order correlation peak P1 in order to perform measurement on characteristics in proximity to another measuring position D2 (which is departed from the measuring position D1) in the measured optical fiber 17. In this case, the timing adjuster 20 is adjusted in timing so as to allow transmission of the light proximate to the measuring position D2 therethrough.

Next, concrete examples of dimensions and measurement results will be described with reference to FIGS. 4A to 4E. Suppose that the length of the measured optical fiber 17 is set to 200 m, and the basic frequency $f_0$ of the frequency modulation of the light source 10 is set to 20 MHz, wherein the apparatus uses correlation peaks of thirty to seventy orders in measurements of characteristics of the measured optical fiber 17. FIGS. 4A to 4C show three positions P39, P40, and P41 corresponding to correlation peaks of thirty-ninth-order, fortieth-order, and forty-first-order, wherein the fortieth-order correlation peak P40 is selected as a subject for measurement. As shown in FIGS. 4D and 4E, the width of a laser pulse of the pump light L2 is set to 50 ns, and the transmission time T1 of the timing adjuster 20 is set to 25 ns.

At the basic frequency $f_0$ (i.e., 20 MHz) of the frequency modulation of the light source 10 (see FIG. 4A), correlation peaks sequentially emerge along with the measured optical fiber 17 by each peak interval do therebetween, wherein $d_0$ is equal to 5 m by the aforementioned calculation of the equation (1). Herein, the position P40 of the fortieth-order correlation peak is moved within 1-meter range in both the leftward and rightward directions. Specifically, the frequency $f_0$ of the frequency modulation is increased to $f_1$ in order to move the position P40 leftwards as shown in FIG. 4B, while the frequency $f_0$ is decreased to $f_2$ in order to move the position P40 rightwards as shown in FIG. 4C. Herein, these frequencies $f_1$ and $f_2$ are set as follows:

$$f_1 = 20.1005 \, [MHz]$$

$$f_2 = 19.9005 \, [MHz]$$

In order to realize step movements of correlation peaks, the frequency $f_m$ of the frequency modulation of the light source 10 is to be changed by each step of 0.0100 MHz.

In summary, in order to perform measurement on characteristics of the measured optical fiber in proximity to the measuring point D1, the frequency $f_m$ of the frequency modulation of the light source 10 is basically set to $f_0 = 20$ MHz, and then it is adequately varied between $f_1$ and $f_2$. In this case, the pulse modulator 18 is fixed in timings to produce laser pulses, and the timing adjuster 20 is also fixed in timing. Thus, it is possible to completely measure the distribution in the 2-meter range with respect to the measuring point D1. In order to perform measurement on the adjacent area of the measured optical fiber, the frequency $f_m$ of the frequency modulation is set again, and the timing adjuster 20 is changed in timing as necessary.

As described heretofore, this invention has a variety of technical features and effects, which will be described below.

(1) The optical fiber characteristic measurement apparatus of this invention is designed in such a way that the probe light corresponding to the continuous light beam is input to one end of the measured optical fiber, while the pump light corresponding to laser pulses is input to the other end of the measured optical fiber, wherein as the pump light propagates through the measured optical fiber, correlation peaks sequentially emerge in a time-series manner at different positions in the measured optical fiber. This invention is characterized by using the timing adjuster that adjusts the timing to allow transmission of only the light proximate to the measuring point in the measured optical fiber therethrough. Therefore, it is possible to perform measurement on characteristics of the measured optical fiber at the desired position by merely adjusting the timing of the timing adjuster. This provides an effect that measurement can be consecutively performed entirely over the relatively long length of the measured optical fiber.

(2) This invention is designed in such a way that the measurement range is not necessarily limited by the interval of distance between adjoining correlation peaks and can be freely enlarged by varying the frequency of the frequency modulation effected in the light source.

(3) Since laser beams are adequately modulated in frequency or phase, it is possible to produce 'narrow' correlation peaks at variable positions in the measured optical fiber. Hence, it is possible to measure characteristics of the measured optical fiber in proximity to measuring points with high spatial resolutions.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. An optical fiber characteristic measurement apparatus comprising:
   a light source for radiating a laser beam;
   an input means for inputting the laser beam radiated from the light source as probe light into one end of a measured optical fiber to be measured;
   a pulse modulator for producing light pulses based on the laser beam radiated from the light source, which laser pulses are input as pump into the other end of the optical fiber;
   a timing adjuster at the other end of the optical fiber for adjusting a transmission timing of light output from the other end to allow transmission of only light proximate to a measuring point set in the optical fiber; and
   a light detector responsive to the output of the timing adjuster for detecting intensity of the light transmitted through the timing adjuster, for measuring at least one characteristic of the optical fiber.

2. An optical fiber characteristic measurement apparatus according to claim 1, wherein the timing adjuster is adjusted in response to timings at which the pulse modulator produces light pulses, a time taken for the pump light pulse output from the pulse modulator to reach the measuring point in the optical fiber and a time taken for the light proximate to the measuring point to reach the timing adjuster.

3. An optical fiber characteristic measurement apparatus according to claim 1, wherein the input means comprises a light modulator that modulates the laser beam radiated from the light source and applied into the one end of the optical fiber, and further comprising a light wavelength filter arranged between the timing adjuster and the light detector to isolate and transmit therethrough light components, which are modulated by the light modulator, within the probe light that is transmitted through the timing adjuster.

4. An optical fiber characteristic measurement apparatus according to claim 2, wherein the input means includes a light modulator that modulates a part of the laser beam radiated from the light source, and further comprising a light wavelength filter arranged between the timing adjuster and the light detector to isolate and transmit therethrough light components, which are modulated by the light modulator, within the probe light that is transmitted through the timing adjuster.

5. An optical fiber characteristic measurement apparatus according to claim 1, wherein the input means includes a light frequency shifter that shifts the frequency of the laser beam radiated from the light source and further comprising a light wavelength filter arranged between the timing adjuster and the light detector to isolate and transmit therethrough light components, which are shifted in light frequency by the light frequency shifter, within the probe light that is transmitted through the timing adjuster.

6. An optical fiber characteristic measurement apparatus according to claim 2, wherein the input means includes a light frequency shifter that shifts the frequency of the laser beam radiated from the light source and further comprising a light wavelength filter arranged between the timing adjuster and the light detector to isolate and transmit therethrough light components, which are shifted in frequency by the light frequency shifter, within the probe light that is transmitted through the timing adjuster.

7. An optical fiber characteristic measurement apparatus according to any one of claims 1 to 6, wherein the light source comprises one laser for radiating the laser beam, and a signal generation circuit for modulating the laser beams radiated from the laser.

8. An optical fiber characteristic measurement apparatus comprising:
   a light source for producing laser beams;
   a light modulator for modulating the frequency of the laser beams to produce sidebands with respect to a center wavelength of the laser beams, to produce a lower sideband of the modulated laser beams is used as probe light (L1) input into one end of an optical fiber whose characteristics are to be measured;
   a pulse modulator for producing laser pulses based on the laser beams as pump light (L2), which is input into the other end of the optical fiber;
   a timing adjuster for receiving output light from the other end of the optical fiber and for adjusting a transmission timing (T1) to allow transmission therethrough of light proximate to a measuring point in the optical fiber ; and
   a light detector for detecting intensity of the light transmitted through the timing adjuster.

9. An optical fiber characteristic measurement apparatus according to claim 8, wherein the light modulator adjust the frequency of the frequency modulation of the light source in each of a positive and negative direction relative to the center wavelength to move a correlation peak in one direction or the other in relation to the measuring point in the optical fiber.

10. An optical fiber characteristic measuring method comprising the steps of:
    inputting laser beams radiated from a light source as probe light into one end of an optical fiber to be measured;
    producing laser pulses based on the laser beams radiated from the light source;
    inputting the laser pulses into the other end of the optical fiber as pump light;
    allowing transmission of light proximate to a measuring point in the optical fiber that occur within the output light from the other end of the optical fiber; and
    detecting the intensity of the light proximate to the measuring point for measuring at least one characteristic of the optical fiber.

11. An optical fiber characteristic measuring method comprising the steps of:
    producing laser beams;
    modulating the frequency of the laser beams to produce light having sidebands with respect to a center wavelength of the laser beams;
    inputting the modulated light having the lower sideband into one end of an optical fiber to be measured as probe light (L1);
    producing light pulses based on the laser beams;
    inputting the light pulses into the other end of the optical fiber as pump light (L2);
    extracting output light from the other end of the optical fiber;
    adjusting a transmission timing (T1) to allow from within the extract output light the transmission of light occurring proximate to a measuring point in the optical fiber; and
    detecting from the light selected by the adjusting timing step the intensity of the light proximate to the measuring point in the optical fiber.

12. An optical fiber characteristic measuring method according to claim 11 further comprising the step of:
    increasing or decreasing the frequency of the frequency modulation to move a correlation peak in one direction or the other in relation to the measuring point in the optical fiber.

* * * * *